April 3, 1951
R. T. McCRUM
2,547,651
ICE CREAM DIPPER
Filed Dec. 17, 1947
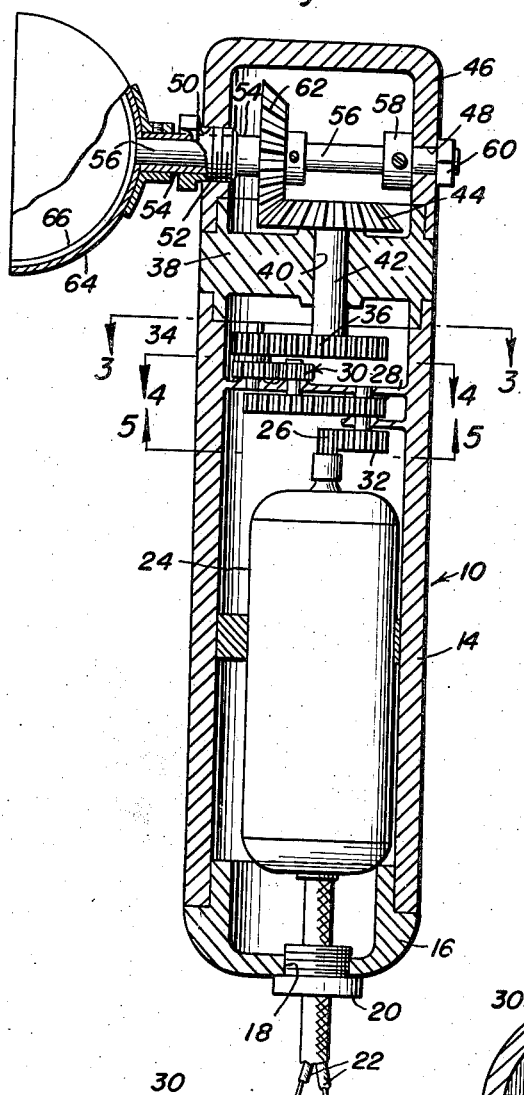
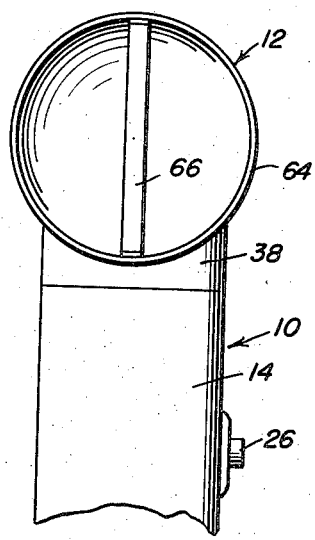
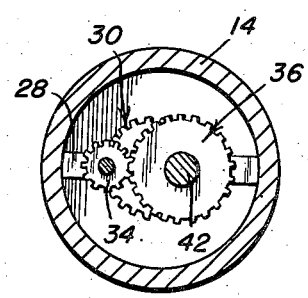
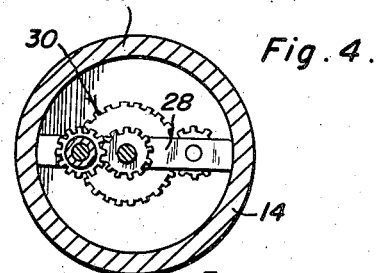
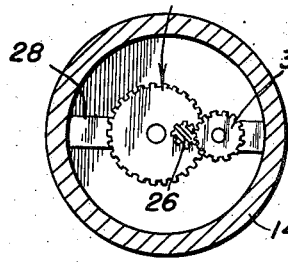
Inventor
Robert T. McCrum
By Clarence A. O'Brien
and Harvey B. Jacobson
Attorneys Patented Apr. 3, 1951

2,547,651

UNITED STATES PATENT OFFICE 2,547,651

ICE CREAM DIPPER

Robert T. McCrum, Hawthorne, Calif.

Application December 17, 1947, Serial No. 792,211

1 Claim. (Cl. 107—48)

This invention relates to a dipper for ice cream or the like and has for its primary object rapidly to enter the frozen body of ice cream to cut therefrom the material which is to be contained in the dipper.

Another object is to facilitate the ejection of the contents of the dipper after it has been filled.

The still further object is to preserve the parts which contact the ice cream in a sanitary condition, and avoid the collection of germs and bacteria thereon.

The above and other objects may be attained by employing this invention which embodies among its features a cup mounted to rotate about its longitudinal axis, a stationary scraper blade within the cup, the blade conforming to the contour of the inner side wall of the cup, and means for rotating the cup.

Still other features include an elongated hollow handle, a shaft adjacent one end of the handle, said shaft being fixed against rotation and lying along an axis which lies perpendicular to an intersects the longitudinal axis of the handle, one end of the shaft projecting beyond the peripheral confines of the handle, a sleeve rotatably mounted on the shaft and projecting at one end beyond the peripheral confines of the handle, a cup mounted on the sleeve to rotate therewith about its longitudinal axis, a scraper blade fixed to the shaft within the cup and conforming in shape to the inner side wall of the cup, an electric motor within the handle, speed reduction gearing in the handle to establish driving connection between the motor and the sleeve, and means on the handle within easy reach of the user to control the energization of the motor.

In the drawings:

Figure 1 is a longitudinal sectional view through an ice cream dipper embodying the features of this invention, Figure 2 is a fragmentary front view of the dipper, Figure 3 is a horizontal sectional view taken substantially along the line 3—3 of Figure 1, Figure 4 is a horizontal sectional view taken substantially along the line 4—4 of Figure 1, and Figure 5 is a horizontal sectional view taken substantially along the line 5—5 of Figure 1.

Referring to the drawings in detail the ice cream dipper comprises a handle designated generally 10 and a scoop designated generally 12. The handle comprises a tubular body portion 14 into one end of which is slidably fitted a cap 16 having an axial opening 18 for the reception of a bushing 20 through which a pair of insulated electrical conductors 22 enter the handle 10. This cap carries an annular flange 17 which slidably enters the tubular body portion 14 and forms a stop by which the motor, to be more fully hereinafter described, is located in the handle 10.

Mounted within the tubular body 14 is an electrical drive motor 24 having a drive shaft which carries a spur pinion 26 for a purpose to be more fully hereinafter explained. One of the conductors 22 is connected directly to the motor while the other conductor is connected to a conventional push button mechanism 27 which in turn is connected in a conventional manner to the terminal of the motor opposite that to which the other conductor 22 is connected. As shown one end of the motor 24 engages the flange 17 which forms a seat for the motor and by extracting the flange 17 from the tubular body 14 the cap 16 may be removed to allow the motor 24 to be extracted from the handle for servicing.

Extending transversely through the tubular body 14 adjacent the end remote from the cap 16 are supporting bars 28 in which a suitable speed reduction gear train designated generally 30 is supported. One gear 32 of the speed reduction gear train 30 has meshing engagement with a spur pinion 36, the purpose of which will be more fully hereinafter explained.

Slidably fitted in the end of the tubular body 14 remote from the cap 16 is an end wall 38 provided with an axial bore 40 which aligns axially with the gear 26 of the motor 24, and mounted for rotation in the opening 40 is a shaft 42 to which the gear 36 is fixed in any conventional manner. The end of the shaft 42 opposite to that carrying the gear 36 has coupled thereto for rotation therewith a beveled pinion 44 the purpose of which will be more fully hereinafter described. Owing to the fact that the end wall 38 is slidably coupled with the tubular body 14 it is obvious that by merely withdrawing it axially from the body 14, the gears 36 and 34 will be disengaged and access may be had to the interior of the tubular body 14 and the gear train 30.

Slidably fitted on the end of the wall 38 remote from the body 14 is a cap 46 through which extends diametrically opposed axially aligned openings 48 and 50. The opening 50 is internally screw threaded to receive a bushing 52 in which a sleeve 54 is mounted to rotate. The bore of the sleeve 54 is substantially equal in diameter to the diameter of the opening 48, and extending through the opening 48 and the sleeve 54 is a shaft 56 carrying adjacent the wall of the cap 46 formed with the opening 48 a set collar 58. The end of the shaft 56 which projects through the opening 48 is externally screw threaded to receive a clamp nut 60 which is adapted to cooperate with the set collar 58 in locking the shaft 56 against rotation.

Fixed to the inner end of the sleeve 54 is a beveled pinion 62 which as illustrated in Figure 1 when the parts are assembled has meshing engagement the beveled pinion 44, and fixed to the outer end of the sleeve 54 is a cup 64 forming the ice cream scoop previously mentioned. The end of the shaft 56 remote from that carrying the nut 60 projects axially through the cup 64 and has welded or otherwise fixed thereto a scraper blade 66 which as illustrated in Figures 1 and 2 conforms to the concave inner face of the wall of the cup 64 so that as the latter is rotated about the axis of the shaft 56, its entire inner surface will be scraped by the blade.

In use the handle 19 is grasped in the hand of the user and pressure applied to the push button 26 to energize the motor 24 and set the pinion 26 into operation. Rotation of the pinion 26 will drive the gear train 30, thus to impart rotary motion to the shaft 42 which is transmitted through the beveled pinions 44 and 62 through the sleeve 54 and thence to the cup 64. The rotation of the cup will facilitate its entrance into the body of ice cream or the like to be dispensed and enable the cup to easily and quickly be filled. Upon extracting the scoop 12 from the body of ice cream pressure is released on the button 26 so that the contents of the cup 64 may be transferred to any desired point for discharge therefrom. Discharge of the contents of the cup may easily and quickly be attained by pressing the button 26 to cause the cup to rotate about the scraper 66 with the result that the contents of the cup will be scraped loose therefrom and may be deposited in any suitable receptacle.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

An ice cream dipper comprising a tubular body having an open forward end, supporting bars within the body at its open end, a speed reduction gear train supported on said bars, an electric motor within the body and operatively connected to said gear train, a cap, an end wall joining the cap to the open end of said body and closing the open end of said body, said cap being removable from said body for access to said gear train, said end wall having a central opening, a shaft rotatably mounted in said central opening and including forward and rear ends, a driven shaft rotatably supported by said cap and disposed at right angles to said first named shaft, one end of said driven shaft projecting outwardly from the cap, a cup mounted on the outwardly projecting end of said driven shaft, a beveled gear on the forward end of said first mentioned shaft and located within the cap, another beveled gear on the driven shaft located within the cap and meshing with the first named beveled gear, and a gear on the rear end of said first mentioned shaft meshing with said gear train.

ROBERT T. McCRUM.

REFERENCES CITED

The following references are of record in the file of this patent:

UNITED STATES PATENTS

| Number | Name | Date |
|---|---|---|
| 1,574,788 | Brueseke | Mar. 2, 1926 |
| 1,763,389 | Chapman | June 10, 1930 |
| 1,877,935 | Millo | Sept. 20, 1932 |
| 2,412,050 | Lawrence | Dec. 3, 1946 |